(12) United States Patent
Hansen

(10) Patent No.: US 10,916,815 B2
(45) Date of Patent: Feb. 9, 2021

(54) BATTERY ORIENTATION SYSTEM

(71) Applicant: SENSUS SPECTRUM, LLC, Raleigh, NC (US)

(72) Inventor: Adam D. Hansen, Cary, NC (US)

(73) Assignee: SENSUS SPECTRUM, LLC, Raleigh, NC (US)

( * ) Notice: Subject to any disclaimer, the term of this patent is extended or adjusted under 35 U.S.C. 154(b) by 338 days.

(21) Appl. No.: 15/928,630

(22) Filed: Mar. 22, 2018

(65) Prior Publication Data
US 2019/0296404 A1 Sep. 26, 2019

(51) Int. Cl.
G01C 9/06 (2006.01)
H01M 10/48 (2006.01)
H01M 10/42 (2006.01)

(52) U.S. Cl.
CPC .......... H01M 10/48 (2013.01); G01C 9/06 (2013.01); H01M 10/425 (2013.01); H01M 2220/10 (2013.01)

(58) Field of Classification Search
CPC ...................................................... G01C 9/06
USPC ......................................................... 33/303
See application file for complete search history.

(56) References Cited

U.S. PATENT DOCUMENTS

| 5,086,292 | A | * | 2/1992 | Johnson | G01F 15/007 324/110 |
| 5,877,703 | A |  | 3/1999 | Bloss et al. | |
| 5,994,892 | A | * | 11/1999 | Turino | G01D 4/004 324/142 |
| 6,523,424 | B1 |  | 2/2003 | Hayes et al. | |
| 6,628,207 | B1 |  | 9/2003 | Hemminger et al. | |
| 7,432,823 | B2 |  | 10/2008 | Soni | |
| 8,352,191 | B2 |  | 1/2013 | McAhren | |
| 8,730,042 | B2 | * | 5/2014 | LaFrance | G01R 11/24 324/110 |
| 8,754,634 | B2 |  | 6/2014 | Chamarti et al. | |
| 8,797,169 | B1 |  | 8/2014 | McCleary et al. | |
| 8,970,393 | B2 | * | 3/2015 | Benson | G01D 4/006 340/870.02 |
| 8,978,443 | B2 |  | 3/2015 | Ramirez | |
| 9,121,883 | B2 | * | 9/2015 | Ramirez | G01R 33/02 |
| 9,671,254 | B2 | * | 6/2017 | Zigovszki | G01R 11/24 |
| 10,326,171 | B2 | * | 6/2019 | Herrema | H01M 10/0431 |
| 10,628,706 | B2 | * | 4/2020 | Shrestha | G06K 9/6232 |

(Continued)

FOREIGN PATENT DOCUMENTS

WO   2017173221 A1   10/2017

OTHER PUBLICATIONS

International Search Report and Written Opinion issued in counterpart PCT Application No. PCT/US2019/023508 dated May 24, 2019.

Primary Examiner — Yaritza Guadalupe-McCall
(74) Attorney, Agent, or Firm — Olive Law Group, PLLC; Ronald A. Rudder

(57) ABSTRACT

A system for battery gravitation-orientation detection. The system has a battery, an accelerometer fixed relative to the battery or optionally fixed relative to a battery housing, a processor programmed to: receive one or more signals from the accelerometer, compute a gravity direction from the one or more signals, and determine if battery or the battery housing is in a sub-optimum orientation for battery life based on the gravity direction and a relative alignment of the gravity direction to the battery or the battery housing.

18 Claims, 10 Drawing Sheets

(56) References Cited

U.S. PATENT DOCUMENTS

| | | |
|---|---|---|
| 2010/0273041 A1 | 10/2010 | Lawall et al. |
| 2011/0095623 A1* | 4/2011 | Doh ................... B60L 53/00 |
| | | 307/119 |
| 2011/0161136 A1 | 6/2011 | Faith et al. |
| 2012/0016544 A1 | 1/2012 | Pariseau et al. |
| 2012/0060606 A1* | 3/2012 | Lakich ................ G01R 11/24 |
| | | 73/514.16 |
| 2012/0259567 A1* | 10/2012 | Lapierre ............ H01M 10/441 |
| | | 702/63 |
| 2013/0017421 A1* | 1/2013 | Onnerud ................ H01M 2/34 |
| | | 429/61 |
| 2013/0110426 A1* | 5/2013 | Van Olst ............... G06F 1/1626 |
| | | 702/62 |
| 2014/0143578 A1* | 5/2014 | Cenizal .................. H04B 3/54 |
| | | 713/340 |
| 2016/0082208 A1 | 3/2016 | Ballam et al. |
| 2016/0240186 A1 | 8/2016 | Leabman |
| 2016/0351028 A1* | 12/2016 | Brennan, Jr. ...... G08B 13/1436 |
| 2017/0051903 A1* | 2/2017 | Maglica ............... H05B 45/395 |
| 2017/0279164 A1* | 9/2017 | Herrema ............ H01M 10/486 |
| 2019/0260090 A1* | 8/2019 | Herrema ............ H01M 10/484 |
| 2019/0296404 A1* | 9/2019 | Hansen ............... H01M 10/425 |
| 2019/0347518 A1* | 11/2019 | Shrestha ............ G06K 9/00718 |
| 2019/0385385 A1* | 12/2019 | Davidson ............... G07C 5/085 |
| 2020/0044209 A1* | 2/2020 | Huggins ............... H02J 7/0042 |

* cited by examiner

BATTERY ORIENTATION SYSTEM

BACKGROUND OF THE INVENTION

Field of the Invention

The present invention relates to a system and method for monitoring the status of utility boxes at the time of installation and while in service including a battery orientation of batteries in the utility boxes.

Description of the Related Art

In utility boxes, electrical connections may deteriorate for a variety of reasons, such as aging, harsh treatment, removal and insertion of a meter or operation in poor environments. A deteriorated electrical connection may exhibit increased temperature prior to catastrophic failure of the electrical connection. For example, if an electrical connection is oxidized or corroded, or if a mechanical deterioration (e.g., reduced spring force in the meter socket jaws) results in poor connection between contacts in an electrical connection, a resistance of the electrical connection may increase. When the resistance of an electrical connection increases, power dissipation and a corresponding thermal temperature of the electrical connection may likewise increase.

Besides these environmental factors, tampering and improper installation can adversely affect the lifetime and longevity of utility boxes in service.

The following patent documents (the contents of which are incorporated herein by reference in their entirety) describe techniques used prior to the present invention for monitoring the status of utility boxes at the time of installation and while in service.

U.S. Pat. No. 5,086,292 entitled "Tamper detection device for utility meter" describes a system for detection of tampering with a utility meter provides not only an indication that tampering has occurred but also sufficient information to enable an estimation of actual consumption to be made as opposed to the tampered metered consumption. The device in the '292 patent includes a plurality of tampering sensors sensing tilt, electric field, magnetic field, temperature, sound, reverse rotation of a moving element and excessive difference between metered consumption and an approximate actual consumption.

U.S. Pat. No. 5,877,703 entitled "Utility meter transmitter assembly for subsurface installations" describes an improved assembly for housing electronics for remote reading of meter reading data in a subsurface enclosure includes a first inner enclosure of metal for housing the receiver/transmitter circuitry, a second inner enclosure for housing a battery and an outer enclosure of plastic which encloses both of the inner enclosures and additionally provides a sealed compartment for an antenna.

U.S. Pat. No. 7,432,823 entitled "Tamper detection apparatus for electrical meters" describes a tamper detection apparatus for an electric meter installed at a facility supplied power through an electrical distribution system. A sensor of the '823 patent senses movement of the meter more than a predetermined amount with respect to the receptacle, whether or not electricity is flowing through the meter, and produces a tampering signal when this occurs. Generation of a tampering signal results in a tamper alert signal being transmitted to the system through a two-way communications path established between the facility and the system.

U.S. Pat. No. 8,352,191 entitled "Seismic detection in electricity meters" describes an arrangement for recording seismic events includes an electricity meter sensor circuit, a digital processing circuit, and an accelerometer operably connected to the digital processing circuit. The accelerometer in the '191 patent is configured to provide signals representative of seismic information to the digital processing circuit. A memory in the '191 patent is configured to store data records relating to at least some of the seismic information.

U.S. Pat. No. 8,754,634 entitled "System and method for tamper detection in a utility meter" describes systems and methods for detecting the removal of a meter cover are provided. For example, a tamper-detect energy meter may include metering circuitry, a processor, a tamper detect switch, and a cover with a switch interface surface. In the '634 patent, the tamper detect switch may be triggered from an open circuit state to a closed circuit state as the switch interface surface of the cover contacts the tamper detect switch during removal.

U.S. Pat. No. 8,797,169 entitled "Systems and methods for sensing and indicating orientation of electrical equipment with passive cooling" describes a system for sensing and indicating orientation of electrical equipment comprises an orientation sensor and control logic. The control logic in the '169 patent is configured to compare predefined data with an orientation of the electrical equipment sensed by the orientation sensor in order to determine whether the sensed orientation of the equipment is within an acceptable range such that sufficient cooling by a cooling system is likely to occur. If the sensed orientation of the equipment is not within the acceptable range, the control logic in the '169 patent transmits a notification signal so that corrective action can occur.

U.S. Pat. No. 8,978,443 entitled "Shock detection in a utility meter having reporting capability" describes an arrangement for use in a utility meter which includes an accelerometer, a processing circuit, and a source of power. The accelerometer in the '443 patent is configured to detect impact force on a utility meter housing. The processing circuit in the '443 patent is operably coupled to receive information representative of detected shock events from the accelerometer, and is configured to store information regarding detected shock events in a non-volatile memory.

U.S. Pat. Appl. Publ. No. 2016/0351028 entitled "Tamper Detection In Utility Meters" describes devices to detect utility theft, as well as methods of their use. The devices in the '028 publication are utility meters that have a positioning detector; a microprocessor connected to receive readings from the positioning detector; a memory storage device in communication with the microprocessor, and at least one power source to provide power to the microprocessor and the memory storage device. Combining positioning readings with theft detection algorithms allows increased accuracy in the automated detection of theft, even when grid power is not available to power the accelerometer or compass.

SUMMARY OF THE INVENTION

In one embodiment, there is provided a system for battery gravitational orientation detection. The system has an accelerometer fixed relative to a battery or a battery housing including the battery, a processor programmed to: receive one or more signals from the accelerometer, compute a gravity direction from the one or more signals, and determine if the battery is in a sub-optimum orientation for battery life based at least on the gravity direction.

In one embodiment, there is provided a method for battery gravitational orientation detection. The method measures a gravity direction relative to a battery or a battery housing in a utility box, determines if a gravitation-orientation of the battery in the utility box is acceptable, and issues an alert if the gravitation-orientation of the battery or the battery housing in the utility box is unacceptable.

In one embodiment, there is provided a network of gravitational orientation detectors. The network has a plurality of sensors, with each sensor having a battery or a battery housing, an accelerometer fixed relative to the battery or the battery housing, and a processor programmed to receive one or more signals from the accelerometer, compute a gravity direction from the one or more signals.

It is to be understood that both the foregoing general description of the invention and the following detailed description are exemplary, but are not restrictive of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE INVENTION

One problem that is faced by a utility is that of knowing the status of utility boxes at installation and after installation.

A particular problem addressed by this invention is knowing the gravitational orientation of batteries installed in electronic equipment in positions underground or otherwise not accessible for long periods of time or else when having to access the installed positions would cause a significant downtime or expense to the gas, water, or electric utility. In this case, the electronic equipment installed in these remote (or otherwise inaccessible) positions has to operate as long as possible on the available battery life. In some cases, the battery life can be supplemented by an axillary power source such as 120 volts on an electric line or perhaps a solar cell or photoelectric converter. However, in many situations, the remote box is underground and not accessible to other power sources. Even if the batteries have access to other sources of power, a battery lifetime is dependent on the number of charge cycles. Therefore, having one cycle of battery discharge last as long as possible is advantageous.

To extend battery life, electronic equipment is often designed to run on duty cycles and/or to run only after wake-up calls, which can conserve a battery's charge and prolong the battery lifetime. However, these measures do not serve to extend a battery's life in actual use charging or discharging. Rather, these measures merely extend the time before the battery dies.

The inventors have realized that, since the battery life can be adversely affected by the gravitation-orientation of the battery, it was important to detect the battery orientation especially at the time of installation.

In one embodiment of the invention, a battery in the utility box contains a liquid (or fluid-type) electrolyte and because of its internal construction is sensitive to orientation. It is preferred to keep the positive terminal of the battery in an upright or horizontal position. If the positive terminal of the battery is pointing downward, the life of the battery can be greatly reduced.

Accordingly, in one embodiment of the invention, there is provided a battery housing for example which can uniquely fix a direction of one or more batteries relative to the battery housing, an accelerometer attached to the battery or the battery housing, and a processor programmed to receive one or more signals from the accelerometer, compute a gravity direction (e.g., from a gravity vector) from the one or more signals, and determine if battery is in a sub-optimum orientation for battery life based on the gravity direction and a relative alignment of the gravity direction to the battery or the battery housing.

Figure 1:
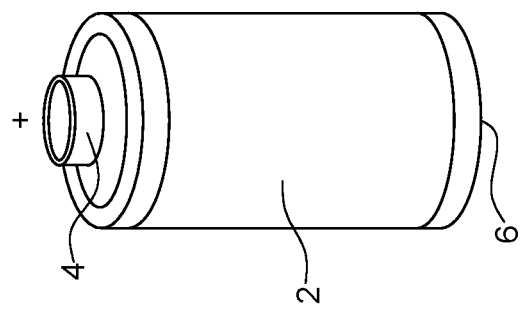
FIG. 1 is a schematic of a battery gravitational orientation in which the positive terminal of the battery is located on the top side of the battery in a vertical plane.
Figure 2:
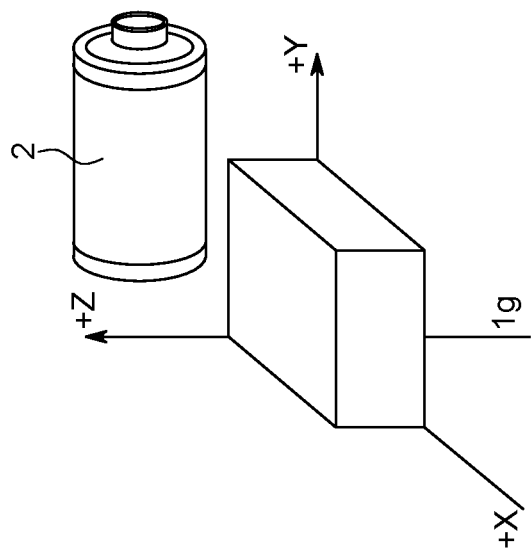
FIG. 2 is a schematic of another acceptable battery orientation in which the positive terminal of the battery is located in a horizontal plane.
Figure 3:
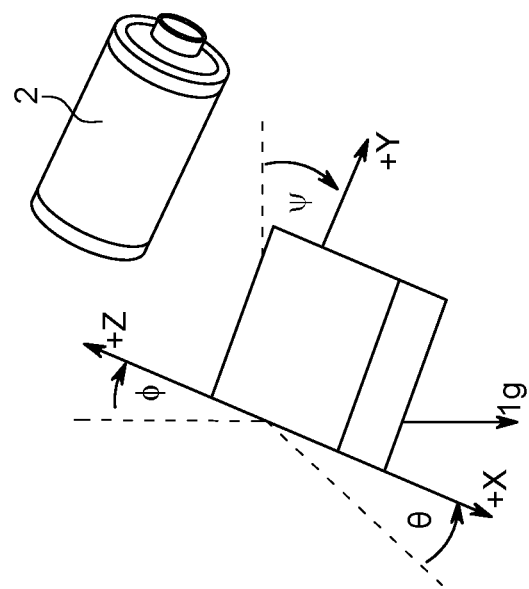
FIG. 3 is a schematic of a problematic battery orientation in which the positive terminal of the battery is tilted down from a horizontal plane, causing a reduced battery life.

FIG. 1 is a schematic of an acceptable battery gravitational orientation in which the positive terminal of the battery is located on the top side of the battery in a vertical plane. FIG. 2 is a schematic of another acceptable battery gravitational orientation in which the positive terminal of the battery is located in a horizontal plane. FIG. 3 is a schematic of a problematic battery gravitational orientation in which the positive terminal of the battery is tilted down from a horizontal plane, causing a reduced battery life. According to one embodiment of the invention, it is preferable to design a utility box where the battery installation is maintained in one of the preferred the directions and is not held or maintained in the adverse position with a cathode pointing in a downward direction.

While the present invention is not limited to any theory as to the degradation of a battery lifetime upon its orientation relative to gravity being held or maintained under a sub-optimum orientation, the origin of the degradation is related to the cathode's location in a fixed area whereas the electrolyte (e.g., a mixture of zinc chloride and water or potassium hydroxide and water or thionyl chloride with an electrolyte salt) may fall or drain away from the cathode (the positive terminal) under the influence of gravity. In a sub-optimum orientation, at the top of a battery cell, there is a space having an area of the anode and cathode not covered by the electrolyte. Under this arrangement, the lifetime of the battery with the uncovered electrode(s) is reduced because of the lack of the same available electrode area as compared to when the battery had the entire area of the electrodes covered. This problem of electrode(s) being uncovered under in the sub-optimum orientation typically is more severe with larger batteries which have larger empty spaces for the electrolyte to fall into. In general, because of this problem, one can expect the battery lifetimes to be reduced up to 40% in some battery designs upon improper gravitational alignment of the battery. Accordingly, it is preferable that the battery orientation not result in an electrolyte disposition therein where the electrolyte uncovers a part of the electrodes.

While it may seem straightforward to ensure that the battery is in the proper orientation, because of the hidden aspect of the battery orientation inside the utility box being installed, there is no guarantee that the installer in the field has placed the utility itself in an orientation which preserves the battery orientation. For example, if the utility box is opaque, then the installer will not know the battery orientation inside the utility box. Furthermore, the battery housing may also be opaque.

Battery Deployment

As noted above, in one embodiment of the invention, an accelerometer is fixed to the battery or the battery housing (or to the utility box). A processor in communication with the accelerometer (typically but not necessarily a three-axis accelerometer) determines if battery is in a sub-optimum orientation for battery life based on the gravity direction and a relative alignment of the gravity direction to the battery housing.

In one embodiment of the invention, the gravity direction is derived from a gravity vector calculated from measurements received from a three-axis accelerometer. FIGS. 2 and 3 illustrate how the three acceleration components yield a gravity vector, from which a direction of the gravity vector relative to the battery can be derived. Furthermore, in one embodiment of the invention, the accelerometer is fixed to the battery housing, a direction of the gravity vector relative to the housing can be derived, from which the gravity direction relative to the battery can be derived. See FIGS. 6 and 7 and the description below.

In one embodiment of the invention, the gravity direction is derived from a single axis accelerometer that is aligned with the anode-cathode axis of the battery. A positive gravitation direction would mean that the positive side of the battery is pointed upwards, therefore acceptable. Conversely, a negative gravitation direction would mean that the negative side of the battery is pointed upwards, therefore unacceptable.

Figure 4:
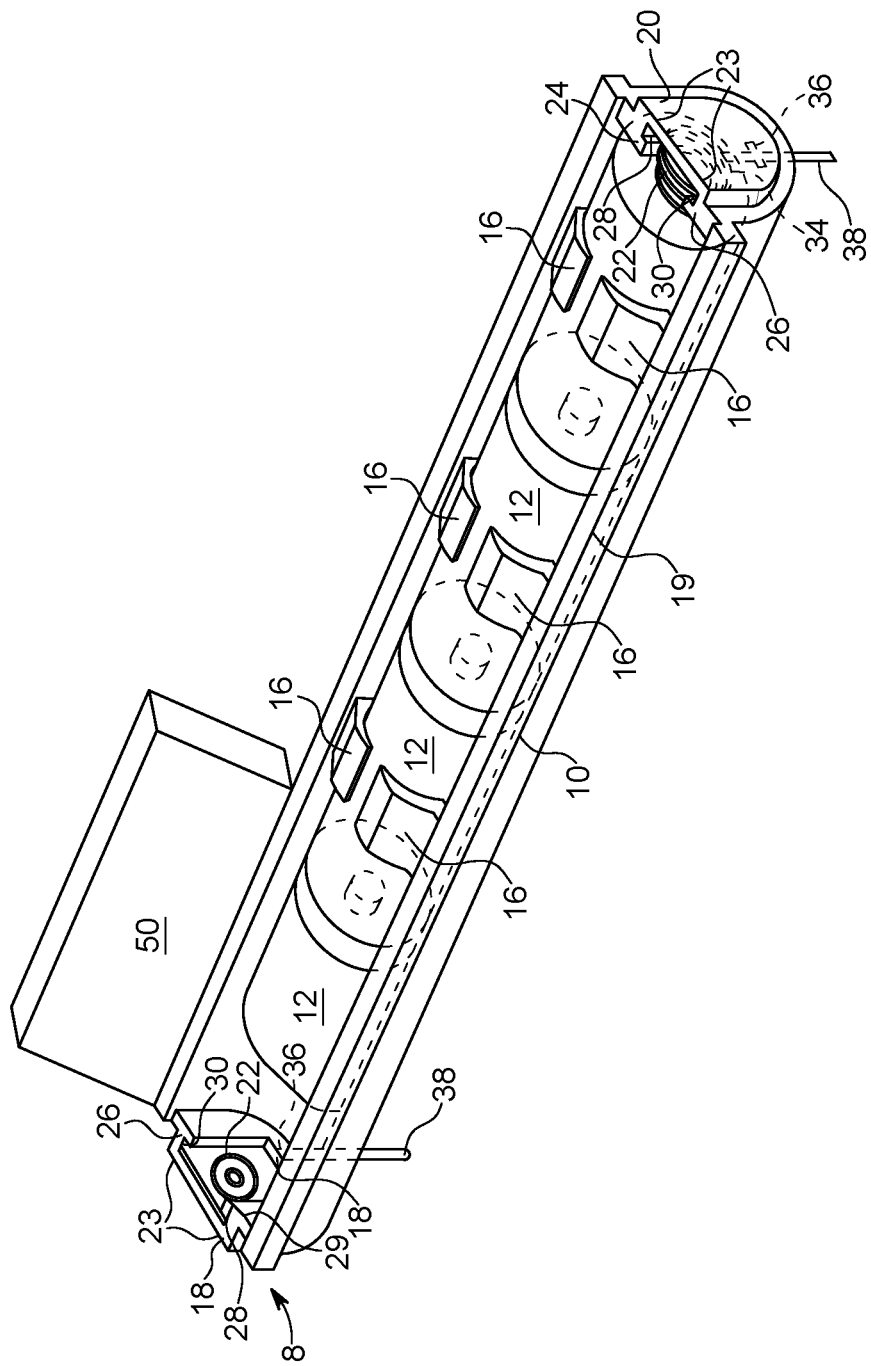
FIG. 4 is a schematic depicting a battery housing with a three axis-axis accelerometer installed thereon.

FIG. 4 is a schematic of an in-line multiple battery housing of the invention with a three-axis accelerometer disposed thereon. The battery housing 8 is similar to that described in U.S. Pat. No. 3,859,140 (the entire contents of which are incorporated herein in its entirety). Battery housing 8 in this embodiment includes a U-shaped rigid plastic trough 10 of an electrically insulating material having a curved bottom wall portion for conforming generally to the configuration of cylindrical battery cells 12. Trough 10 can have a pair of strengthening edge flanges extending along the side wall lips. Extending inwardly and upwardly from the inner surface of the trough side walls are optional opposing pairs of fingers 16 having lower curved surfaces for engaging and blocking the cylindrical battery cells 12 against removal from trough 10. While shown holding multiple battery cells 12, the battery housing of this type could be made such that it holds only one battery cell 12.

Each end wall 18, 20 as shown can have a rectangular recess at 22 which is open to the interior of trough 10 and which extends to form a slot-like opening 23 at the top inner edge of wall 18, 20 forming the trough end lip 29. Each recess 22 can have a pair of opposing lip flanges 24 and 26 along the sides of the recess 22 defining opposing parallel grooves 28 and 30 extending to the opening 23.

The recess 22 in end plate 18 can have a fixed contact in the form of an electrically conductive plate 32 having parallel edges snug fit in grooves 28 and 30 to secure plate 32 in a position for electrical contact with a top button contact of the battery cell 12. At the other end of the holder, the recess 22 in end plate 20 can have an opposing electrical contact providing a snug fit in the grooves 28 and 30. Each recess 22 may also be provided with a bottom port 36 through which an extension or lead of the electrical contact 32 or 34 can project as seen at 38 for connection to external circuitry. In one embodiment of the invention, the three-axis accelerometer is a part of processor 50 attached to the battery housing 8, although the accelerometer could be merely in communication with processor 50 and disposed on another part of the battery housing or fixed to the utility box.

In this embodiment of the invention, the sub-optimal orientation would exist when the cathode (button) of the battery cell 12 is pointed downward. Thus, in one embodiment of this invention, a processor (such as processor 50 noted above) is programmed to receive one or more signals from a accelerometer, compute a gravity vector from the one or more signals, derive a gravity direction from the gravity vector, and determine if battery is in a sub-optimum orientation for battery life based on a) the gravity direction and a relative alignment of the gravity direction to the battery housing, and b) knowledge of the battery deployment inside the housing 8.

Figure 5:
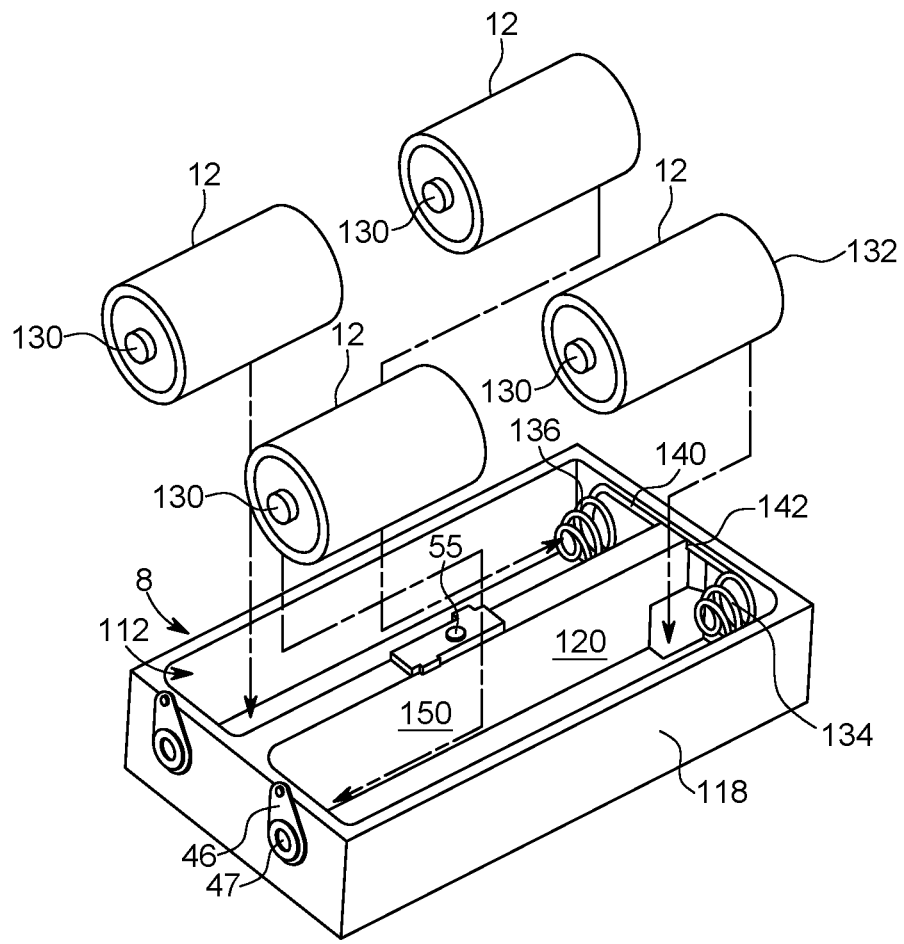
FIG. 5 is a schematic of another battery housing of the invention with a three-axis accelerometer disposed thereon.

In another embodiment, the battery housing of this invention can be different from the in-line configuration shown in FIG. 4. FIG. 5 is a schematic of a paired battery housing of the invention upon which an accelerometer could be disposed thereon. The battery housing 8 shown in FIG. 5 is similar to that described in U.S. Pat. No. 4,161,568 (the entire contents of which are incorporated herein in its entirety). The battery housing 8 may be formed of molded plastic, for example. As shown, battery housing 8 holds four conventional C-size battery cells 12. As is well known, such battery cells are generally cylindrical and have terminals of the polarities of each battery pointed in the same direction. The positive terminals 130 are buttons protruding from one end of the dry cells, and the negative terminals 132 are part of the opposite end of the dry cells. A pin and flange mechanism 55 secures the batteries once the batteries are placed in compartments 112 and 114.

Each compartment 112 and 114 is provided with appropriate contacts for engaging adjacent battery terminals. A contact 134 is provided at one end of compartment 114 and a contact 136 is provided at the opposite end of compartment 112. A straight extension 140 of contact 136 may pass through a notch at one end of common side wall 120 and be electrically connected to the contacts. Contacts may be springs as shown or other metal posts or plates which make electrical contact to the battery posts. Contacts 134 and 136 ensure that the batteries are urged into engagement with one another and that electrical continuity between the contacts of the batteries is established. External lead structures, flange 46 and center tap 47 provide for an electrical connection through the housing 8. In this embodiment of the invention, the sub-optimal orientation would exist when any one of the cathodes of the batteries are pointed downward.

In one embodiment, a three-axis accelerometer is attached to side wall 118. In another embodiment, a single-axis accelerometer is attached to side wall 118 and aligned parallel the longitudinal axis of the batteries. Here, as noted above, a positive gravitation direction would mean that the positive side of the battery is pointed upwards, therefore acceptable. Conversely, a negative gravitation direction would mean that the negative side of the battery is pointed upwards, therefore unacceptable.

Gravitation-Orientation

As used herein, gravitation-orientation refers to the orientation of battery's cathode or anode relative to the direction of gravity.

Figure 6:
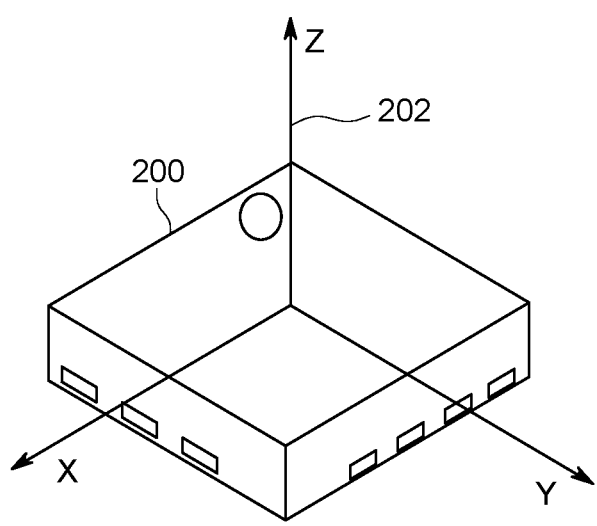
FIG. 6 is a simplified schematic of a three-axis accelerometer.

FIG. 6 is a simplified schematic of a three-axis accelerometer 200 installed for example on a battery housing (not shown). The three-axis accelerometer 200 is represented schematically by the x-, y-, and z-axis vectors, with the z-axis enumerated as 202. A three-axis accelerometer can be used to detect acceleration in any direction. When the device is at rest, the only acceleration detected is that of gravity. Regardless of the orientation of the three-axis accelerometer 200, the gravity vector is 1 g (9.8 m/s$^2$.) The gravity vector can be determined by looking at the magnitudes and polarities of the acceleration in each of the three axes, and optionally summing them through vector addition. In this manner, the exact orientation of the battery housing (or utility box if connected thereto in a fixed orientation) relative to gravity can be determined.

Figure 7:
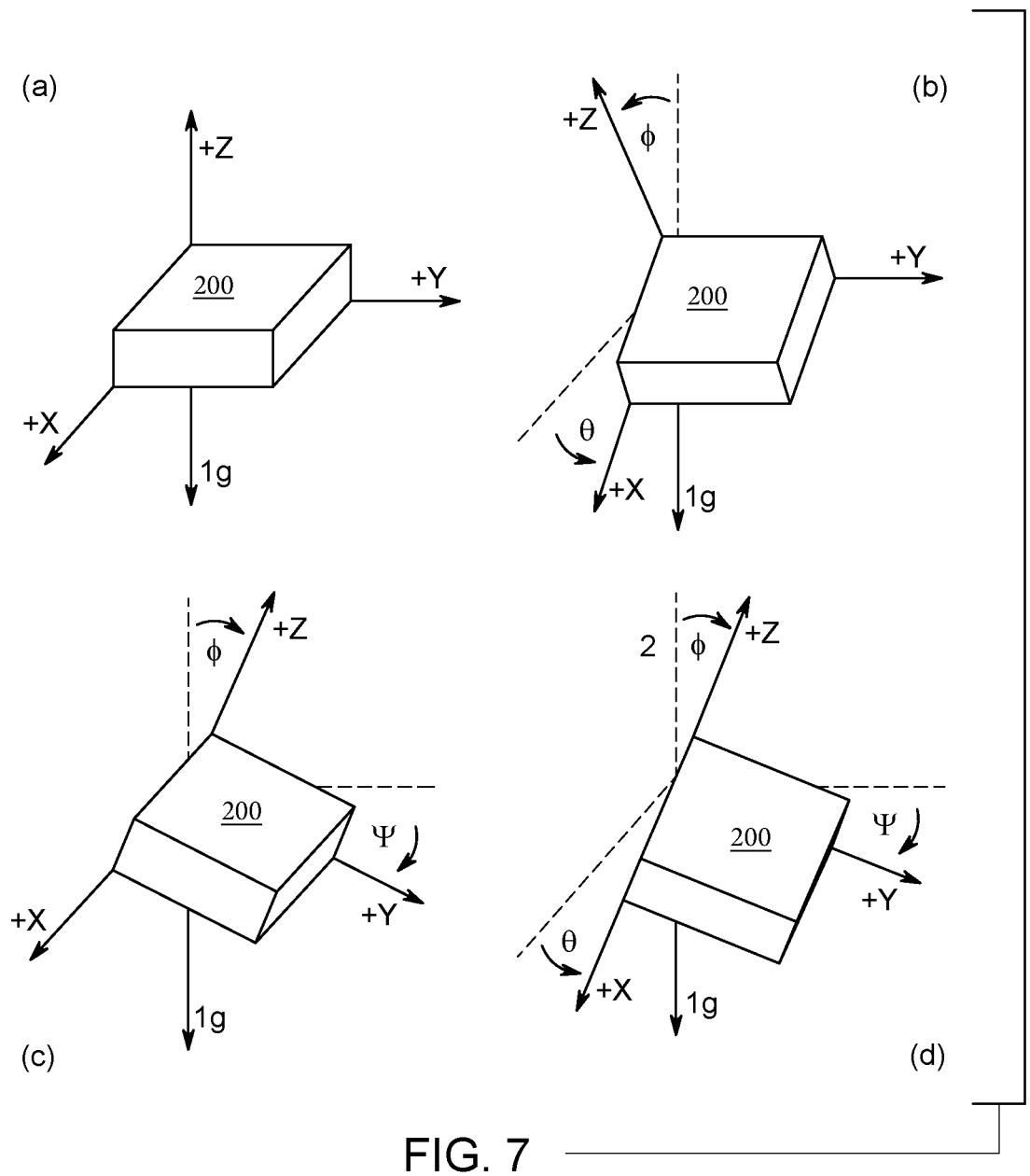
FIG. 7 is a schematic showing the resolving of the gravity vector along the three-axes of the three-axis accelerometer.

FIG. 7 is a schematic showing the resolving of the gravity vector along the three-axes of the three-axis accelerometer 200 shown in FIG. 6. In one embodiment of the invention, the three-axis accelerometer provides a processor such as for example processor 50 in FIG. 4 with the acceleration magnitudes along the x-axis, y-axis, and z-axis. The processor through vector addition (noted above) can determine the direction of gravity. Assuming that the three-axis accelerometer 200 has a known orientation when mounted to the utility box, then the gravitational orientation of the utility box is known. Assuming that the battery housing and battery orientation relative to the utility box is known, then the gravitational orientation of the batteries can be calculated. A similar calculation would follow if the three-axis accelerometer 200 were mounted with the z-axis off-normal to the utility box.

Figure 8A:
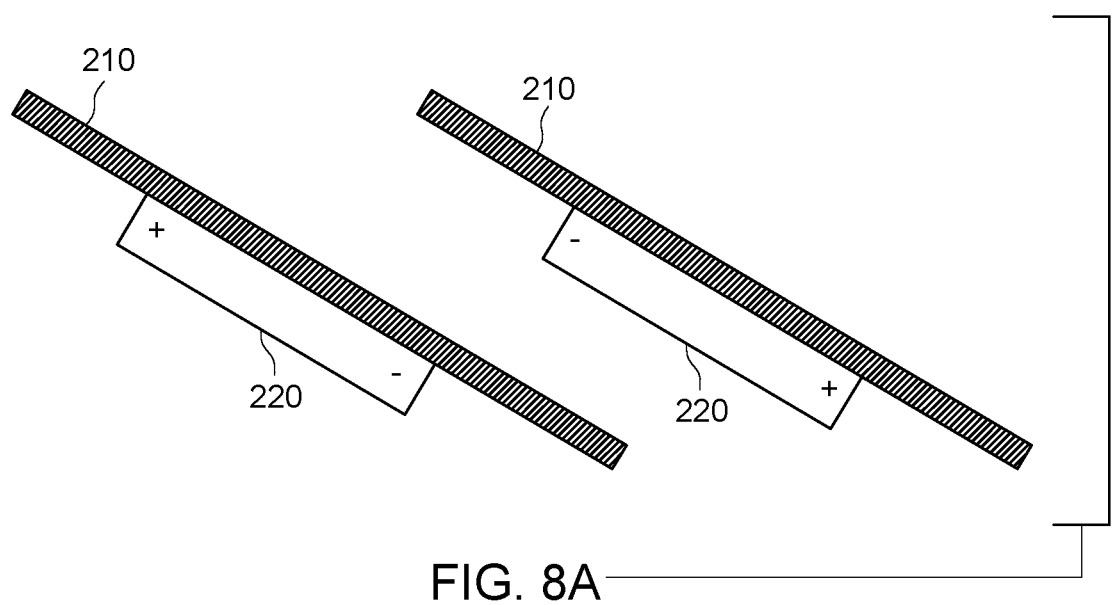
FIG. 8A is a schematic of a utility service with two gravitation-orientations of the battery in utility box.

FIG. 8A is a schematic of a utility service line 210 (water, gas, fluid, electricity) with two gravitation-orientations of the batteries in utility box 220, one with the positive side terminal uphill of its negative side terminal (preferred) and one with the negative side terminal uphill of its positive side terminal (sub-optimum). Here, the installer has another dilemma to resolve with regard to the proper installation of a utility box. That is for installation along a utility service line that is tilted, rotation of the utility box can change the battery's gravitation-orientation from preferred to non-preferred.

Figure 8B:
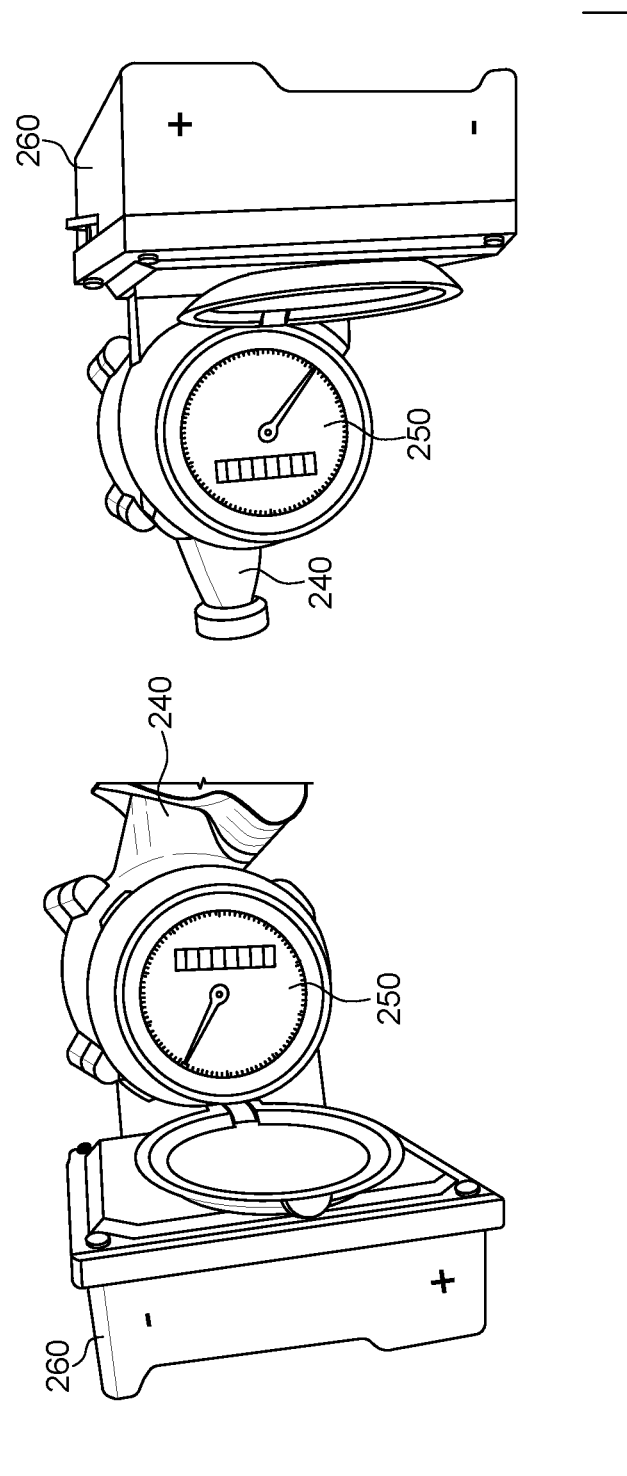
FIG. 8B is schematic showing two orientations of a utility box coupled to a utility service line.

FIG. 8B is schematic perspective of utility service 240, a register 250, and an electronic counter 260 of a coupled to each other. The orientation of the batteries inside counter 260 is denoted by the "+" and "−" symbols thereon. Register 250 typically measures water, fluid, gas, or electrical flow and communicates with the electronic counter 260. In one embodiment of the invention, a flow meter is attached to water register 250. A piezoelectric counter in the water register 250 produces output pulses from water flow through. The electronic counter 260 contain circuitry therein powered at least by batteries (not shown). In one embodiment of the invention, the orientation of the batteries in electronic counter 260 is determined at the time of installation to see if the batteries are in an acceptable orientation. As seen in the depictions in FIG. 8B, there is a degree of freedom in rotating the electronic counter and register around the utility service 240. If the batteries inside the electronic counter 260 are horizontally aligned, then the rotation around the utility service 240 presents no circumstance where the battery orientation is unacceptable. However, if the utility service 240 is mounted vertically as shown, then rotation of the electronic counter would in one circumstance have the cathodes pointed up (acceptable on right hand side) and in another circumstance have the cathodes pointed down (unacceptable on left hand side).

In one embodiment of the invention, installation of utility service 240, a register 250, and an electronic counter 260 may occur without the batteries being installed at that time. The installer uses the gravitational orientation of the battery housing as the guide for proper installation. Late, when the batteries are installed, the gravitational orientation information can be verified.

Accordingly, in one embodiment of the invention, processor 50 provides a signal outside of the utility box 220 which is an indication the battery's gravitation-orientation (or the battery housing's gravitational orientation), including whether the battery is in a sub-optimum gravitation-orientation or an acceptable gravitation orientation. In a problematic installation, that is when it turns out that the positive-side terminal is tilted downward, the installation can be halted, and the installer instructed to re-orient the utility box containing the battery. Thus, in one embodiment of the invention, when processor 50 determining that the battery is oriented in a sub-optimum orientation, a message is broadcast to either the installer or to a central server or both alerting personnel to the improper battery orientation. Alternatively, the message can be stored for later retrieval.

More specifically, in the case where the utility box has been mounted, the magnitude and polarity of the vectors are first captured. Processor 50 is programmed with a conversion, given the uniquely fixed position of the three-axis accelerometer to the battery housing and/or the fixed orientation of the battery inside the battery housing (depending on the type of battery housing: in-line or paired). The measured gravity vector reveals the gravity direction and thus the battery gravitation orientation. If it is found that the battery is in a non-ideal orientation, processor 50 can send a message that the installation can be halted, and the installer instructed to re-orient the unit, as noted above. In one embodiment of the invention, after installation and confirmation of an acceptable battery gravitation orientation, processor 50 can send a signal is transmitted to the utility server (or otherwise to another party) as validation of proper installation.

Figure 8C:
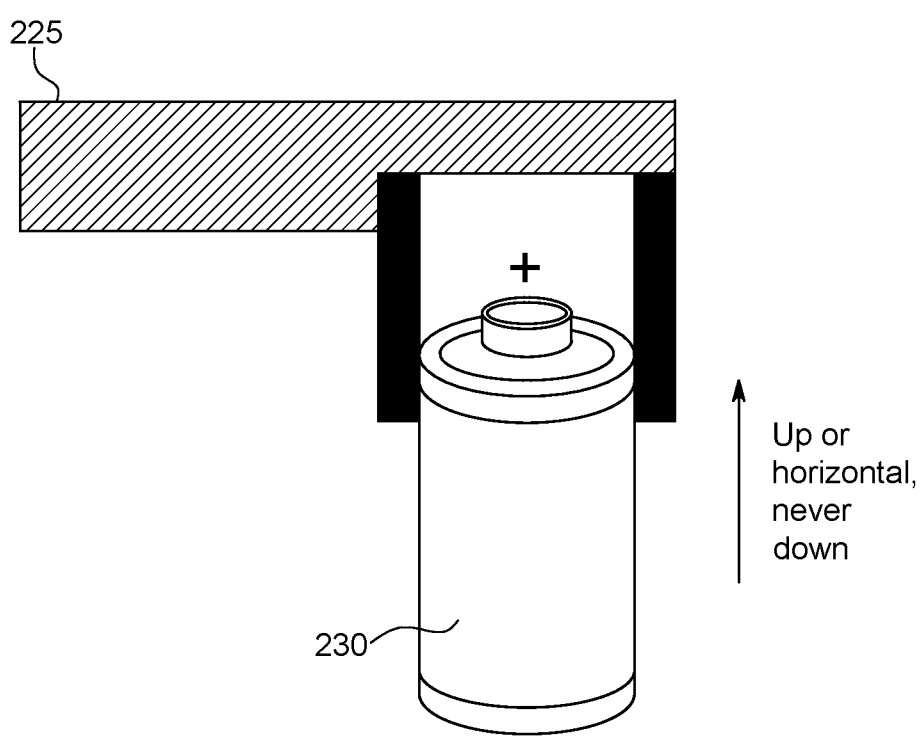
FIG. 8C is a schematic of a processor unit (containing therein an accelerometer and a processor) in which the unit is directly attached to a battery.

FIG. 8C is a schematic of a battery sleeve 225 (containing therein an accelerometer and a processor) in which the unit is directly attached to battery 230. The processor of battery sleeve 225 functions as the processors described above. In this embodiment, the processor only needs to be programmed with the relative orientation of the accelerometer to the longitudinal axis of the battery 230.

Tilt Detection

In one embodiment of the invention, by capturing the magnitude and polarity of the gravitational vectors when the device is first installed, a change in the orientation of the battery housing inside the utility box (and likewise a change in the orientation of the utility box) can be determined by comparing the current state of the three vectors with the originally captured state. In this embodiment, if the difference between the current state and the starting state exceeds a certain threshold, the unit can be considered tilted, and an alarm is triggered or a notification sent to the utility server.

Because only the difference between initial and current state is used in this calculation, the starting orientation of the utility box is not needed. In other words, a tilt event can be detected regardless of the initial orientation of the utility box or the battery housing. This provides an advantage over mechanical sensors which are designed to be installed in a given orientation.

Meters are frequently installed and mounted in meter pans which are in turn mounted in fixed and rigid positions on utility poles or the sides of buildings. Several types of events can dislodge the meters or pans from their intended installation positions. Some of these events include vehicle collision, storms, earthquakes, and drought induced soil subsidence. Disturbance of the meters and their attached electrical wiring can result in electrical shorts, high temperature connections, and fires. Tampering with the meter by its removal from the socket by unauthorized personnel will also cause movement of the meter from its installation position. Remedial action taken based upon detection of this dislodging can mitigate further damage or loss of property. By adding a multiple axis accelerometer to the internal circuitry of a meter (or in general to a utility box), an internal processor can monitor the accelerometer for changes in position (translation in one or more of the three physical directions) or orientation (rotation in one or more of the three physical axis). In this embodiment, the battery or battery housing gravitational orientation becomes a flag or status indicative of an untampered or a tampered state.

If the internal processor detects a change in position or orientation that exceeds a fixed or programmable threshold, the processor can take multiple actions. The processor could declare an alarm state. In this alarm state, the processor could cause the alarm to be reported on the meter's display if one is available, or if a communication channel is available if could report the alarm via the communication channel. It the meter has an internal service disconnect switch, the processor could disconnect service in the event of an alarm.

In one embodiment of the invention, the installation of the three axis accelerometer with the battery housing provides the present invention with the capability to detect tampering or an environmental impact on a utility box. For example, by removing a register from a meter body, water could continue to flow but the register would no longer detect it. Accordingly, in one embodiment of the invention, the three-axis accelerometer with the battery housing is installed in the register. Removal of the register would generate a change in the orientation vectors and alert the utility to the tampering event.

In parts of Canada recently, drought induced soil subsidence has placed stress on utility meters attached to buildings, in particular stress at the electrical joints/connections connecting the utility lines to the meter. Fires at these stressed electrical joints/connections are possible. The movement of the ground relative to the utility meter pulls the utility meter and typically twists the meter box gradually as the soil or ground subsides.

Here, in the present invention, processor 50 would detect a slow and gradual change in position or orientation of the accelerometer, the battery, the battery housing, or the utility box that exceeds a fixed or programmable threshold. The movement would distinguish from higher frequency tamper events or seismic shaking or weather conditions. Essentially, the processor would be programmed to track the average position per day (or other preprogrammed time period) and monitor the change in the average position. As before, the processor can take multiple actions. The processor could declare an alarm state. In this alarm state, the processor could cause the alarm to be reported on the meter's display if one is available, or if a communication channel is available if could report the alarm via the communication channel. It the meter has an internal service disconnect switch, the processor could disconnect service in the event of an alarm.

External Communication

Figure 9:
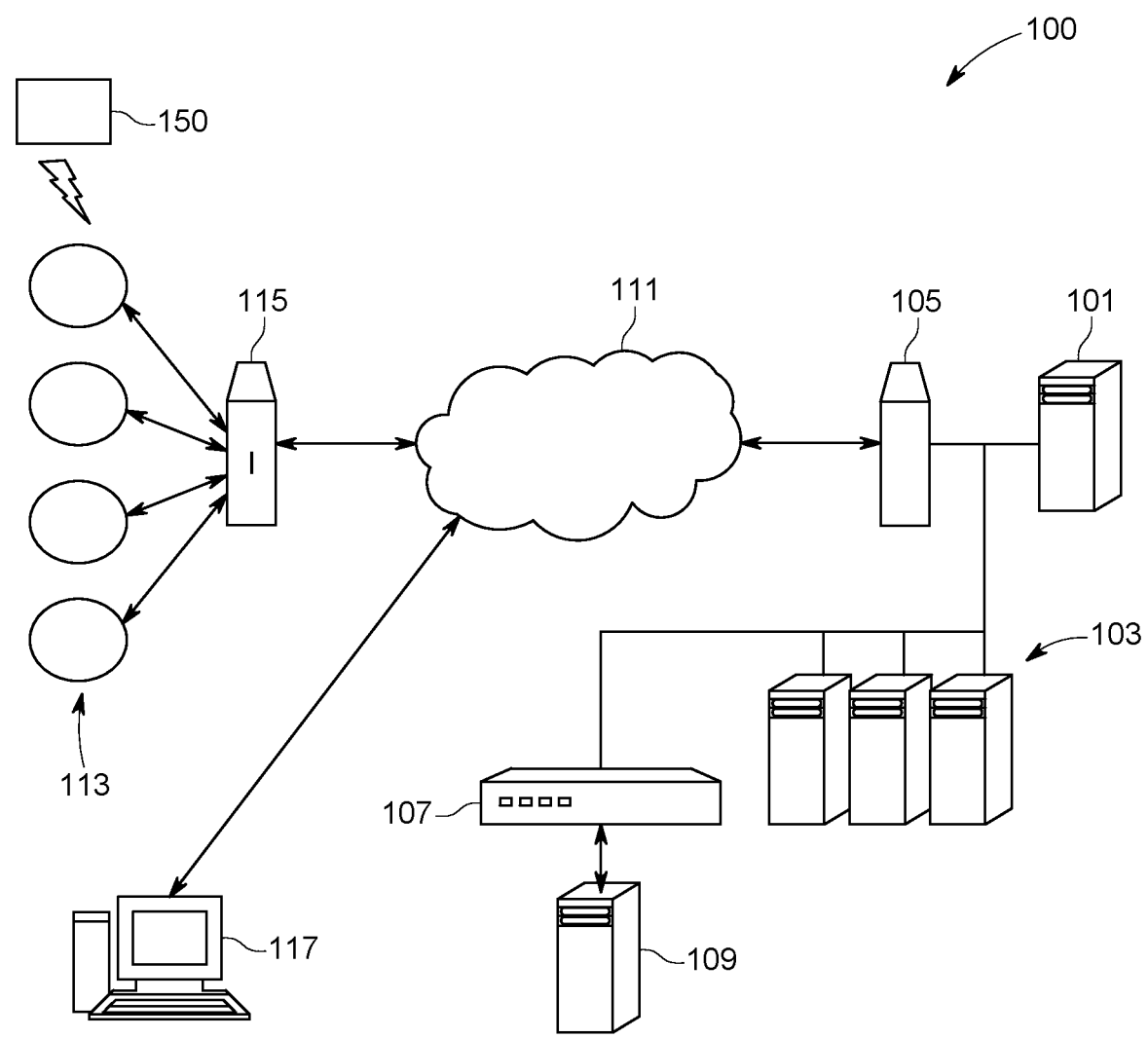
FIG. 9 is a schematic of a communication system connecting utility boxes to a utility server or to an installer or a controller.

In accordance with the invention, FIG. 9 depicts a communication system 100 by which for example the utility boxes 113 can communicate to a utility server 101 or to the installer via a controller 115. Utility server 101 can be coupled to a data center 103 that includes databases where acquired data from the three axis accelerometer or externally acquired data can be stored and optionally time-stamped.

System 100 may be coupled via a firewall 105 to a wired or wireless network 111 which communicates to utility boxes 113. System 100 can also be accessed via protective firewalls 107 protecting a utility company's virtual private network 109. Bi-directional communication may occur between each utility box 113 and system 100 via point of presence (POP) 115. In addition, Internet communication devices such as personal computer 117 (or smart phone) may access utility boxes 113 and system 100.

The hardware design is not limiting of this invention, and may comprise the controller 115 with program memory, a liquid crystal display or other known displays; a directional sensing infra-red disk interface, an infrared data association (IrDA) communications port for diagnostics; non-volatile memory for data reading/storage; a real-time clock for time stamping of data measurements; and a serial port to interface with various wired or wireless communication modules. Controller 115 which may be a mobile controller can include processor 50 or a functional equivalent thereof, such as a central processing unit (CPU) and/or at least one application specific processor (ASP). Controller 115 (or processor 50) may include one or more circuits or be a circuit that utilizes a computer readable medium, such as a memory circuit (e.g., ROM, EPROM, EEPROM, flash memory, static memory, DRAM, SDRAM, and their equivalents), configured to control the processor to perform and/or control the processes and systems of this disclosure. The computer readable medium can include the methods and algorithms discussed therein as well as gravitation-orientation log files.

In one embodiment of the invention, instructions from processor 50 regarding the battery gravitational orientation is transmitted to mobile controller 115 for communication to an installer or service technicians. In a complex where there are multiple utility boxes of the present invention, controller 50 may be a stationary work station monitored or monitorable by site personnel or remotely monitored by the utility provider.

Each utility box 113 is capable of monitoring the gravitation-orientation in real time. Additionally, data such as utility usage readings, or high frequency vibrations, or long term orientation drifts can be taken at programmed predetermined intervals and can be stored in a non-volatile memory at the box 113 or the utility server 101. Each box 113 can periodically establish a link to system 100.

In one embodiment of the invention, the presence of the three-axis accelerometer in the utility box 113 permits the installer or utility provider to be provided with gravitation-orientation at the time of installation and at programmed report times or query times thereafter.

In one embodiment of the invention, the utility box 113 senses the gravitation-orientation and sends a signal to the installer's phone (or other network) that the utility box has been placed in an orientation with the battery in one of the preferred directions. In one embodiment of the invention, the utility box having determined that its battery is placed in the proper direction sends a notification to the installer and then ceases communication with the installer or the utility server 101, unless the box is subsequently moved beyond some threshold value. An alert can be sent if the gravitation-orientation changes more than a preprogrammed amount, as a possible indication of tampering In one embodiment of the invention, utility box 113 transmits a signal over a network to a central server that its battery position is not in the preferred orientation. At that point the utility can contact a service technician to correct the problem.

In one embodiment of the invention, utility box 113 senses that there is been substantial movement of the utility overtime. This movement might suggest that the installation placed the utility box 113 in an unstable situation, in which case the installer will be notified of the problem.

In one embodiment of the invention, the presence of the three-axis accelerometer in utility box 113 permits a recording over time of a change in the gravity vector. If this change is repetitive and indicative of excessive environmental vibrations, then the lifetime of the electronic equipment inside the utility box could be adversely affected. In this case, an alert can be provided to service personnel or a central server that the environmental conditions are not the most appropriate for the longevity of the utility box. Situations where this attribute may be most important is where the utility box is attached to a machine whose components are rotating at a significant speed. That is the utility box may be associated with an electric motor turning a reciprocating device or revolving device. Should the reciprocating device or the revolving device become unbalanced, vibrations will be transmitted to the utility box the utility box sensing the excessive vibration it can then alert a service person or a central router as to the vibrational disturbance.

In another example, the network of utility boxes 113 shown in FIG. 9 may be above ground on utility poles. Weather conditions such as wind and ice storms would result in the gravitation-orientation vectors changing over time. By tracking the amount of displacements during those adverse environmental conditions, planned service interruptions could be implemented prior to catastrophic interruption of service. By contrast, in one embodiment of the invention, a processor in the utility box or the utility server measures a long-term drift in the orientation such as from the ground subsidence noted above. Alert conditions can be programmed when the long-term drift exceeds a threshold. Due the presence of short-term variations such as noted above, the average orientation is calculated for example on a weekly basis, and the averaged positions per week are then compared to a threshold to ascertain a long term change in orientation. In one embodiment of the invention, a processor in utility box 113 (or utility server 101) is programmed to recognize and differentiate between at least one of seismic events or soil subsidence or weather events based on a temporal period of the disturbances.

In another example, the network of utility boxes 113 shown in FIG. 9 could sense and report seismic activity. In one embodiment of the invention, in earthquake zones, the widespread adoption of utility boxes 113 with the three axis-axis accelerometers would result in a sensor network capable of monitoring the degree of movement of "standard" fixtures (telephone poles, building walls, underground walls). These sensors would then represent more accurate/direct measures of the effect of seismic activity than distributed Richter scale sensors measuring the strength of the earthquake from which the impact of which would be surmised.

Computerized Method of the Invention

Figure 10:
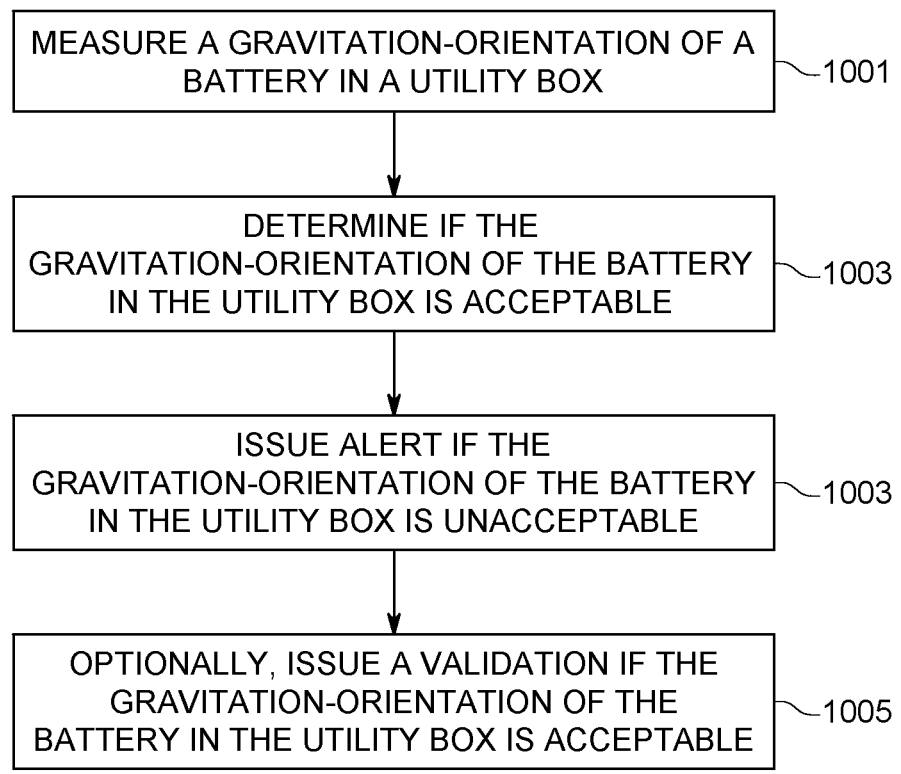
FIG. 10 is a flowchart depicting a method of the invention for battery gravitational orientation detection.

FIG. 10 is a flowchart depicting a computerized method of the invention.

At step 1001, measure a gravitation-orientation of a battery (or a battery housing) in a utility box. At step 1002, determine if the gravitation-orientation of the battery in the utility box is acceptable. At step 1003, issue an alert if the gravitation-orientation of the battery (or the battery housing) in the utility box is unacceptable. Optionally, at step 1005, issue a validation if the gravitation-orientation of the battery (or the battery housing) in the utility box is acceptable.

The computerized method embodied for example in processor 50 can provide the installer or utility provider with gravitation-orientation at the time of installation and at programmed report times or query times thereafter. The computerized method can sense the gravitation-orientation and sends a signal to the installer's phone that the utility box has been placed in an orientation with the battery in one of the preferred directions or in a sub-optimum orientation.

The computerized method embodied for example in processor 50 can store acquired data from the three axis accelerometer or externally acquired data. Regardless, the acquired data can be time-stamped. The computerized method can monitor the gravitation-orientation in real time. The computerized method can distinguish between high frequency vibrations or long term orientation drifts and provide appropriate alerts.

The computerized method embodied for example in processor 50 can record over time of a change in the gravity vector. The computerized method can assess if this change is repetitive and indicative of excessive environmental vibrations. In that case, the computerized method can send an alert to service personnel or a central server that the environmental conditions are not the most appropriate for the longevity of the utility box.

The computerized method can track the amount of displacements during adverse environmental conditions and alert the utility if a planned service interruption should be implemented prior to a catastrophic interruption of service. The computerized method can sense and report seismic activity.

STATEMENTS OF THE INVENTION

The following numbered statements of the invention set forth generalized aspects of the invention.

Statement 1. A system for battery gravitational orientation detection, comprising: an accelerometer fixed relative to a battery or a battery housing including the battery, a processor programmed to: receive one or more signals from the accelerometer, compute a gravity direction from the one or more signals, and determine if the battery and/or the battery housing is in a sub-optimum orientation for battery life based at least on the gravity direction.

This system of statement 1 can further include any combination of the elements set forth in whole or in part in the numbered statements below.

Statement 2. The system of statement 1, wherein the sub-optimum orientation is an orientation where a positive contact to one or more batteries is underneath the one or more batteries.

Statement 3. The system of statement 1, wherein the processor is programmed to communicate the sub-optimum orientation to a field technician or a utility provider.

Statement 4. The system of statement 1, wherein the battery and/or the battery housing has a preset orientation relative to the utility housing.

Statement 5. The system of statement 1, wherein the processor is programmed to communicate a change in orientation after installation to a utility provider.

Statement 6. The system of statement 1, wherein the accelerometer is a three-axis accelerometer configured to provide signals to the processor related to a first direction of gravity.

Statement 7. The system of statement 6, wherein the processor is programmed to convert the first direction of gravity for the accelerometer into a second direction of gravity for the battery housing.

Statement 8. The system of statement 7, wherein the processor is programmed to associate the second direction of gravity with a battery gravitational orientation.

Statement 9. The system of statement 8, wherein the processor is programmed to store an alert for later transmission or transmit an alert when the battery and/or the battery housing is in the sub-optimum orientation.

Statement 10. The system of statement 9, wherein the processor is programmed to transmit the alert to at least one of an installer device, a central controller, or a utility-provider server.

Statement 11. The system of statement 8, wherein the processor is programmed to store a status confirmation for later transmission or transmit a status confirmation when the battery and/or the battery housing is in a proper orientation.

Statement 12. The system of statement 11, wherein the processor is programmed to transmit the status confirmation to at least one of an installer device, a central controller, or a utility-provider server.

Statement 13. The system of statement 7, wherein the processor stores chronologically at least one of the first direction of gravity or the second direction of gravity. The processor can also store the presence of sub-optimal condition (or the presence of optimal conditions).

Statement 14. The system of statement 8, wherein the processor transmits an alert or an alarm (or stores the alert or the alarm for later transmission) when changes in at least one of the first direction of gravity or the second direction of gravity exceeds a threshold.

Statement 15. The system of statement 1, further comprising a utility box having therein the battery and/or the battery housing.

Statement 16. The system of statement 1, wherein the accelerometer is attached to the battery housing and is oriented in a fixed direction relative to the battery housing.

Statement 17. The system of statement 1, wherein the accelerometer is attached to the utility box and is oriented in a fixed direction relative to the battery and/or the battery housing.

Statement 18. The system of statement 1, wherein the sub-optimum orientation for battery life comprises a cathode of one of the batteries tilted downward by more than a programmed percentage, for example more than 2% from horizontal.

Statement 19. The system of statement 1, wherein the sub-optimum orientation for battery life comprises a cathode of one of the batteries tilted downward by more than a programmed percentage, for example more than 5% from horizontal.

Statement 20. The system of statement 1, wherein the sub-optimum orientation for battery life comprises a cathode of one of the batteries tilted downward by more than a programmed percentage, for example more than 10% from horizontal.

Statement 21. The system of statement 1, wherein the sub-optimum orientation for battery life comprises a cathode of one of the batteries tilted downward by more than a programmed percentage, for example more than 20% from horizontal.

Statement 22. The system of statement 1, wherein the processor comprises circuitry for registering water, oil, or gas or fluid flow through a meter and communicating the water or gas flow to a utility provider.

Statement 23. The system of statement 1, wherein:
the accelerometer is configured to provide one or more signals representative of an orientation of the battery and/or the battery housing relative to gravity; and
the processor is programmed to:
store the one or more signals at a time of installation of a utility box having the battery housing,
compare the one or more signals at the time of installation to subsequent signals from the accelerometer, and
thereby detect a change in the orientation of the battery and/or the battery housing.

Statement 24. The system of statement 23, wherein the processor comprises circuitry for at least one of storing the change in orientation or communicating the change in orientation to a utility provider.

Statement 25. The system of statement 23, wherein the processor is programmed to recognize tamper events.

Statement 26. The system of statement 23, wherein the processor is programmed to recognize environmental disturbances.

Statement 27. The system of statement 26, wherein the processor is programmed to recognize and differentiate between at least one of seismic events or soil subsidence or weather events based on a temporal period of the disturbances.

Statement 28. The system of statement 26, wherein the battery housing, the accelerometer, and the processor comprise a sensor, and a network of sensors monitors for the environment disturbances.

Statement 29. A method for battery gravitational orientation detection, comprising:
measuring a gravity direction relative to a battery and/or a battery housing in a utility box;
determining if a gravitational orientation of the battery and/or the battery housing in the utility box is acceptable; and
issuing an alert if the gravitational orientation of the battery and/or the battery housing in the utility box is unacceptable.

Statement 30. The method of statement 30 further comprising issuing a validation if the gravitational orientation of the battery and/or the battery housing in the utility box is acceptable.

Statement 31. A network of gravitational orientation detectors, comprising: a plurality of sensors with each sensor having a battery or a battery housing including the battery therein which uniquely fixes a direction of one or more batteries relative to the battery housing, an accelerometer disposed relative to the battery and/or the battery housing, and a processor programmed to receive one or more signals from the accelerometer, and compute a gravity direction from the one or more signals.

The network of statement 31 can have any of the elements set forth the statements above.

Numerous modifications and variations of the present invention are possible in light of the above teachings. It is therefore to be understood that within the scope of the appended claims, the invention may be practiced otherwise than as specifically described herein.

The invention claimed is:

1. A system for battery gravitational orientation detection, comprising:
   an accelerometer fixed relative to a battery or a battery housing including the battery;
   a processor programmed to: receive one or more signals from the accelerometer, compute a gravity direction from the one or more signals, and determine if the battery of the battery housing is in a sub-optimum orientation for battery life based at least on the gravity direction computed from the one or more signals from the accelerometer,
   wherein the accelerometer is attached to a utility box and is oriented in a fixed direction relative to the battery of the battery housing.

2. The system of claim 1, wherein the sub-optimum orientation is an orientation where a positive contact to one or more batteries is underneath the one or more batteries.

3. The system of claim 1, wherein the processor is programmed to communicate the sub-optimum orientation to a field technician or a utility provider.

4. The system of claim 1, further comprising the battery of the battery housing having a preset orientation relative to the utility box.

5. The system of claim 1, wherein the processor is programmed to communicate a change in orientation after installation to a utility provider.

6. The system of claim 1, wherein the utility box has therein the battery.

7. The system of claim 1, wherein the accelerometer is attached to the battery housing and is oriented in a fixed direction relative to the battery housing.

8. The system of claim 1, wherein the sub-optimum orientation for battery life comprises a cathode of one of the batteries tilted downward by more than a programmed percentage from horizontal.

9. The system of claim 1, wherein:
   the accelerometer is configured to provide one or more signals representative of an orientation of the battery or the battery housing relative to gravity; and
   the processor is programmed to:
   store the one or more signals at a time of installation of a utility box having the battery or the battery housing,
   compare the one or more signals at the time of installation to subsequent signals from the accelerometer, and
   thereby detect a change in the orientation of the battery or the battery housing.

10. The system of claim 9, wherein the processor comprises circuitry for at least one of storing the change in orientation and communicating the change in orientation to a utility provider.

11. A method for battery gravitational orientation detection, comprising:
    measuring with the system of claim 1 the gravity direction relative to the battery or the battery housing in the utility box;
    determining if the gravitational orientation of the battery or the battery housing is acceptable; and
    issuing an alert if the gravitational orientation of the battery or the battery housing is unacceptable.

12. A network of gravitational orientation detectors, comprising: a plurality of sensors with each sensor comprising the system of claim 1 and having, the battery or the battery housing, the accelerometer fixed relative to the battery or the battery housing, and the processor programmed to receive one or more signals from the accelerometer, and compute the gravity direction from the one or more signals.

13. A system for battery gravitational orientation detection, comprising:
    an accelerometer fixed relative to a battery or a battery housing including the battery;
    a processor programmed to: receive one or more signals from the accelerometer, compute a gravity direction from the one or more signals, and determine if the battery or the battery housing is in a sub-optimum orientation for battery life based at least on the gravity direction,
    wherein:
    the accelerometer is a three-axis accelerometer configured to provide signals to the processor related to a first direction of gravity, and
    the processor is programmed to convert the first direction of gravity for the accelerometer into a second direction of gravity for the battery or the battery housing, and the processor is programmed to associate the second direction of gravity with a battery gravitational orientation.

14. The system of claim 13, wherein the processor is programmed to at least one of store an alert and transmit the alert when the battery or the battery housing is in the sub-optimum orientation.

15. The system of claim 13, wherein the processor is programmed to at least one of store a status confirmation and transmit the status confirmation when the battery or the battery housing is in a proper orientation.

16. The system of claim 13, wherein the processor stores chronologically at least one of the first direction of gravity or the second direction of gravity.

17. The system of claim 13, wherein the processor transmits an alert when changes in at least one of the first direction of gravity or the second direction of gravity exceeds a threshold.

18. A system for battery gravitational orientation detection, comprising:
    an accelerometer fixed relative to a battery or a battery housing including the battery wherein the accelerometer is attached to a utility box;
    a processor programmed to: receive one or more signals from the accelerometer, compute a gravity direction from the one or more signals, and determine if the battery or the battery housing is in a sub-optimum orientation for battery life based at least on the gravity direction,
    wherein the processor comprises circuitry for registering gas or liquid fluid flow through a meter in the utility box provided by the utility provider and communicating the fluid flow to a utility provider.

* * * * *